United States Patent
Liu

(10) Patent No.: US 11,483,893 B2
(45) Date of Patent: Oct. 25, 2022

(54) RRC STATE TRANSITION METHOD, TERMINAL, CU, DU, AND COMPUTER-READABLE STORAGE MEDIUM

(71) Applicant: ZTE Corporation, Guangdong (CN)

(72) Inventor: Na Liu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 16/987,522

(22) Filed: Aug. 7, 2020

(65) Prior Publication Data

US 2021/0007170 A1 Jan. 7, 2021

Related U.S. Application Data

(63) Continuation of application No. PCT/CN2018/124017, filed on Dec. 26, 2018.

(30) Foreign Application Priority Data

Feb. 9, 2018 (CN) .......................... 201810135890.5

(51) Int. Cl.
*H04W 76/27* (2018.01)
*H04W 76/19* (2018.01)

(52) U.S. Cl.
CPC ........... *H04W 76/27* (2018.02); *H04W 76/19* (2018.02)

(58) Field of Classification Search
CPC ... H04W 72/04; H04W 72/046; H04W 76/11; H04W 76/12; H04W 76/19; H04W 76/22;
(Continued)

(56) References Cited

U.S. PATENT DOCUMENTS 10,972,932 B2 * 4/2021 Fiorani ............. H04W 28/0252
2018/0049255 A1 * 2/2018 Chen ..................... H04W 72/02
(Continued)

FOREIGN PATENT DOCUMENTS

CN 102202405 A 9/2011
CN 106538037 A 3/2017
(Continued)

OTHER PUBLICATIONS

International Search Report for PCT Appl. No. PCT/CN2018/124017 dated Apr. 1, 2019 (with English translation, 6 pages).
(Continued)

*Primary Examiner* — Jean A Gelin
(74) *Attorney, Agent, or Firm* — Foley & Lardner LLP

(57) ABSTRACT

Disclosed are a Radio Resource Control (RRC) state transition method, a terminal, a Centralized Unit (CU), a Distributed Unit (DU) and a computer-readable storage medium. The RRC state transition method includes: when a terminal changes from a current state to an RRC connected state, the terminal requests to resume an RRC connection by using an existing Signaling Radio Bearer (SRB) configuration; when the terminal receives a response from a Distributed Unit (DU) for request of resuming the RRC connection, if the response comprises a newly allocated SRB configuration, the terminal replaces the existing SRB configuration with the newly allocated SRB configuration to resume the RRC connection.

4 Claims, 6 Drawing Sheets

(58) Field of Classification Search
CPC ..... H04W 76/27; H04W 76/30; H04W 76/32; H04W 88/085; H04W 88/06; H04W 84/02
See application file for complete search history.

(56) References Cited

U.S. PATENT DOCUMENTS

| | | | | |
|---|---|---|---|---|
| 2018/0124647 | A1* | 5/2018 | Dai | H04W 72/08 |
| 2019/0044754 | A1* | 2/2019 | Hampel | H04W 76/12 |
| 2019/0124715 | A1* | 4/2019 | Chen | H04W 76/27 |
| 2019/0297661 | A1* | 9/2019 | Lee | H04W 76/19 |
| 2019/0364462 | A1* | 11/2019 | Kim | H04W 36/08 |
| 2020/0351723 | A1* | 11/2020 | Kim | H04W 76/27 |
| 2020/0383164 | A1* | 12/2020 | Kim | H04W 76/11 |
| 2021/0307100 | A1* | 9/2021 | Talebi Fard | H04W 76/18 |

FOREIGN PATENT DOCUMENTS

| | | |
|---|---|---|
| CN | 107046735 A | 8/2017 |
| WO | WO-2017/114498 A1 | 7/2017 |

OTHER PUBLICATIONS

Extended EP Search Report on EP 18905835.7 dated Apr. 22, 2021 (13 pages).
HUAWEI: "Support RRC inactive mode for CU-DU", 3GPP Draft; R3-173133; Berlin, Germany; Aug. 21, 2017 (2 pages).
Huawei: "UE context management on F1"; 3GPP Draft, R3-171852; Hangzhou, China; May 6, 2017 (4 pages).
Huawei: "UL data transmission without RRC signalling without initiating transition to active (option A)", 3GPP Draft; R2-1700185; Spokane, Washington, US; Jan. 24, 2017 (25 pages).
LG Electronics Inc: "Issue on C-RNTI allocation for RRC connection resume", 3GPP Draft; R3-172266, Qingdao; Jun. 20, 2017 (3 pages).
Mediatek Inc: "RRC Inactive State"; 3GPP Draft, R2-168831; Reno, USA; Nov. 14, 2016 (2 pages).
CATT, "Discussion on UE Context Management and RRC Message Transfer", 3GPP TSG RAN WG3 #98, R3-174539, Reno, Nevada, Nov. 27, 2017-Dec. 1, 2017 (4 pages).
Ericsson, "Inactive to connected state transition", 3GPP TSG RAN WG3 #97bis, R3-173966, Prague, Czech Republic, Oct. 9-13, 2017 (4 pages).
First KR Office Action on KR 10-2020-7025686 dated May 28, 2021 (9 pages, with English translation).
Samsung, "PDCP for MCG DRB and SRB", 3GPP TSG RAN WG2 #99, R2-1709165, Berlin, Germany, Aug. 21-25, 2017 (5 pages).
First Office Action for JP Appl. No. 2020-542876, dated Sep. 10, 2021 (6 pages).
First Office Action for KR Appl. No. 10-2020-7025686, dated Nov. 24, 2021 (with English translation, 6 pages).
ZTE: "Discussion on the solution for UE Initial Access" 3GPP TSG RAN WG3 NR#97bis; R3-173652 Oct. 13, 2017; Prague, Czech (8 pages).
ZTE: "Lest issues on inactive UE over F1 interface" 3GPP TSG RAN WG2 NR Adhoc; R3-180126; Jan. 26, 2018; Sophia Antipolis, France (6 pages).

\* cited by examiner

RRC STATE TRANSITION METHOD, TERMINAL, CU, DU, AND COMPUTER-READABLE STORAGE MEDIUM

CROSS-REFERENCE TO RELATED APPLICATIONS

The present application claims the benefit of priority under 35 U.S.C. § 120 as a continuation of PCT Patent Application No. PCT/CN2018/124017, filed on Dec. 26, 2018, which claims priority to Chinese patent application No. 201810135890.5, filed on Feb. 9, 2018, the disclosure of each of which is incorporated herein by reference in its entirety.

TECHNICAL FIELD

The present application relates to, but not limited to, the technical field of wireless communications and in particular to a Radio Resource Control (RRC) state transition method, terminal, Centralized Unit (CU), Distributed Unit (DU) and computer-readable storage media.

BACKGROUND

5G New Radio (NR) is an ongoing research project of the 3rd Generation Partnership Project (3GPP), which determines a new wireless air interface standard based on Orthogonal Frequency Division Multiplexing (OFDM). and will be a foundation of next generation mobile networks. 5G application scenarios defined by the 3GPP mainly include: enhanced Mobile Broadband (eMBB), Ultra-Reliable and Low Latency Communications (URLLC), and massive Machine Type Communications (mMTC). The three application scenarios have different requirements for latency, coverage, and reliability: the eMBB emphasizes high peak transmission rates, and has low latency requirements and moderate reliability requirements; the URLLC emphasizes low latency and high reliability transmission; and the mMTC emphasizes a large number of terminals and high connection density, requires larger transmission coverage, and has almost no delay requirements.

In order to reduce the data transmission delay as much as possible, reduce the signaling overhead caused by user state migration, and reduce power consumption of terminals, a new RRC state is introduced in the 5G system, namely RRC Inactive state. The RRC inactive state is invisible to a 5G core network (NG-Core). The core network believes that the terminal is still connected, and a 5G base station (gNB) may release the RRC connection of a UE, so that the terminal no longer need to monitor the downlink control channel all the times. In this state, the connection between a user plane and a control plane is maintained between the gNB and the NG-Core, and the UE side saves necessary context information, so that when data is being transmitted and received, the air interface connection may be resumed as quickly as possible.

At the same time, from the perspective of transmission capacity, transmission delay, and ease of deployment, the 5G system introduces the technology of centralized unit-distributed unit separation to reconstruct the gNB into two logical network elements, CU and DU. The CU and the DU may be deployed together or separately according to the scenario and requirements, where an RRC entity, a Packet Data Convergence Protocol (PDCP) entity, and a Service Data Adaptation Protocol (SDAP) entity are placed on the CU side; a radio link control (RLC) entity, a medium access control (MAC) entity, and a physical layer entity are placed on the DU side. The CU and DU sides respectively maintain and process the terminal context.

At present, in the discussion of the NR standard, how to achieve the transition between the RRC inactive state and the connected state in the case of CU-DU separation, no effective solution has been proposed.

SUMMARY

The present application provides an RRC state transition method, a terminal, a Centralized Unit, a Distributed Unit, and a computer-readable storage medium.

An embodiment of the present application provides an RRC state transition method, the method includes the following steps.

When a terminal changes from a current state to a RRC connected state, the terminal requests to resume an RRC connection by using an existing Signaling Radio Bearer (SRB) configuration.

When the terminal receives a response from a DU for request of resuming the RRC connection, if the response includes a newly allocated SRB configuration, the terminal replaces the existing SRB configuration with the newly allocated SRB configuration to resume the RRC connection.

An embodiment of the present application further provides a terminal, and the terminal includes a processor and a memory connected to the processor.

The processor is configured to execute an RRC state transition program stored in the memory to implement the steps of the RRC state transition method according to any one of the above.

An embodiment of the present application further provides a computer-readable storage medium, and the computer-readable storage medium stores one or more programs which, when executed by one or more processors, to implement the steps of the RRC state transition method according to any one of the above.

An embodiment of the present application further provides an RRC state transition method, the method includes the following steps.

When a DU receives a request for resuming an RRC connection from a terminal, the DU allocates a new SRB configuration for the terminal and forwarding the request to a CU.

The DU receives a first response returned by the CU, where the first response includes a newly allocated SRB configuration and/or an SRB configuration pre-saved by the CU.

The DU returns a second response to the terminal by using a default SRB configuration and/or the SRB configuration pre-saved by the CU.

The DU resumes the RRC connection of the terminal by using the SRB configuration in the first response.

An embodiment of the present application further provides a Distributed Unit, and the Distributed Unit includes a processor and a memory connected to the processor.

The processor is configured to execute an RRC state transition program stored in the memory to implement the steps of the RRC state transition method according to any one of the above.

An embodiment of the present application further provides a computer-readable storage medium, and the computer-readable storage medium stores one or more programs which, when executed by one or more processors, to implement the steps of the RRC state transition method according to any one of the above.

An embodiment of the present application further provides an RRC state transition method, the method includes the following steps.

A CU receives a notification from a DU of a request for resuming an RRC connection of a terminal.

The CU allocates a new PDCP configuration for the terminal, and sends the newly allocated PDCP configuration to the DU.

An embodiment of the present application further provides a Centralized Unit, and the Centralized Unit includes a processor and a memory connected to the processor.

The processor is configured to execute an RRC state transition program stored in the memory to implement the steps of the RRC state transition method according to any one of the above.

An embodiment of the present application further provides a computer-readable storage medium, and the computer-readable storage medium stores one or more programs which, when executed by one or more processors, to implement the steps of the RRC state transition method according to any one of the above.

The RRC state transition method, terminal, Centralized Unit, Distributed Unit, and computer-readable storage medium provided in the application resume the RRC connection by using the existing SRB configuration request. When a response returned by a network element such as a DU or a next-generation base station (gNB) based on resuming the RRC connection includes a newly allocated SRB configuration, the newly allocated SRB configuration is used to replace the existing SRB configuration to resume the RRC connection, and the RRC inactive state and the connected state of the terminal can switched when the CU-DU is separated.

DETAILED DESCRIPTION

In order to make the technical solution of the present application more clear, the embodiments of the present application will be described in detail below with reference to the drawings.

Figure 1:
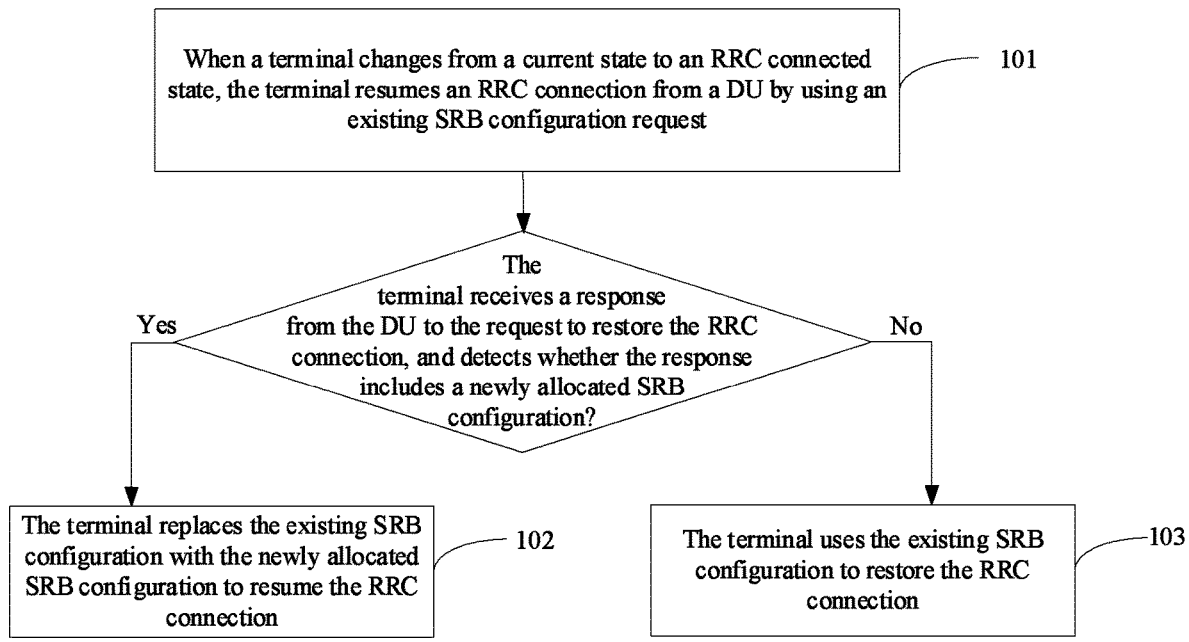
FIG. 1 is a schematic diagram illustrating a flowchart of an RRC state transition method according to an embodiment of the present application.

As shown in FIG. 1, an RRC state transition method according to the present application includes the following steps.

In step 101, when a terminal changes from a current state to an RRC connected state, the terminal resumes an RRC connection by using an existing Signaling Radio Bearer (SRB) configuration request. For example, the terminal may request but not include the request to the DU to resume the RRC connection.

In an embodiment of the present application, the current state is an RRC inactive state.

It should be noted that, in Long Term Evolution (LTE), a terminal is classified into two states: an idle state (IDLE) and a connected state according to whether the RRC connection is established. In a 5G system, a new RRC state is introduced, namely an RRC inactive state.

In an embodiment of the present application, the SRB configuration is an SRB1 configuration.

It should be noted that, in LTE, SRB, as a special Radio Bearer (RB), is only used to transmit RRC and Non-access Stratum (NAS) messages. In 3GPP protocol 36.331, transmission channels for SRBs are defined.

SRB0 is used to transmit RRC messages, and is transmitted on the Common Control Channel (CCCH).

SRB1 is used to transmit RRC messages (may include Piggybacked NAS messages). Prior to the establishment of the SRB2 bearer, SRB1 has a higher priority than SRB2. SRB1 is transmitted on the Dedicated Control Channel (DCCH).

SRB2 is used to transmit NAS messages. The SRB2 has a lower priority than SRB1, and the SRB2 is always configured after a security mode is activated. SRB2 is transmitted on the logical channel DCCH.

In some embodiments, the method further includes the following steps.

When the terminal changes from the current state to an RRC inactive state, the terminal performs any of the following operations.

A PDCP configuration, an RLC configuration and a logical channel configuration are released.

The PDCP configuration, the RLC configuration and the logical channel configuration are saved.

The PDCP configuration is saved, and the RLC configuration and the logical channel configuration are released.

In some embodiments, the existing SRB configuration includes: a default PDCP configuration, a default RLC configuration, and a default logical channel configuration; or the existing SRB configuration includes: the saved PDCP configuration, the saved RLC configuration and the saved logical channel configuration; or the existing SRB configuration includes: the saved PDCP configuration, a default RLC configuration, and a default logical channel configuration.

For example, in some embodiments, when the terminal releases the PDCP configuration, RLC configuration, and logical channel configuration, the existing SRB configuration includes: a default PDCP configuration, a default RLC configuration, and a default logical channel configuration; when the terminal saves the PDCP configuration, RLC configuration, and logical channel configuration, the existing SRB configuration includes: the saved PDCP configuration, the saved RLC configuration, and the saved logical channel configuration; when the terminal saves the PDCP configuration and releases the RLC configuration and the logical channel configuration, the existing SRB configuration includes the saved PDCP configuration, the default RLC configuration, and the default logical channel configuration.

In step 102, when the terminal receives a response from a DU for request of resuming the RRC connection, if the response includes a newly allocated SRB configuration, the terminal replaces the existing SRB configuration with the newly allocated SRB configuration to resume the RRC connection.

In some embodiments, the method further includes the following step.

In step 103, if the newly allocated SRB configuration is not included in the response, the terminal uses the existing SRB configuration to resume the RRC connection.

It should be noted that the response sent by the DU to the request for resuming the RRC connection of the terminal is the response of the CU forwarded by the DU to the request for restoring the RRC connection of the terminal.

When the terminal and the CU respectively save the PDCP configuration, RLC configuration, and logical channel configuration of the terminal in advance, the response does not include the newly allocated SRB configuration.

When the terminal and the CU respectively save part of the SRB configuration of the terminal in advance, or when the terminal and the CU do not save any of the SRB configuration of the terminal in advance, the response includes part of SRB configuration newly allocated or the entire SRB configuration.

In an embodiment of the present application, the response is an RRC Connection Resume message.

In some embodiments, the newly allocated SRB configuration includes any one or merging of the following: a PDCP configuration newly allocated by the CU, an RLC configuration newly allocated by the DU, or a logical channel configuration newly allocated by the DU.

An embodiment of the present application further provides a terminal, and the terminal includes a processor and a memory; the memory is connected to the processor, for example, the memory may be connected to the memory through a bus or the like.

The processor is configured to execute an RRC state transition program stored in the memory to implement the steps of the RRC state transition method according to any one of the above.

An embodiment of the present application further provides a computer-readable storage medium, and the computer-readable storage medium stores one or more programs which, when executed by one or more processors, implement the steps of the RRC state transition method according to any one of the above.

Figure 2:
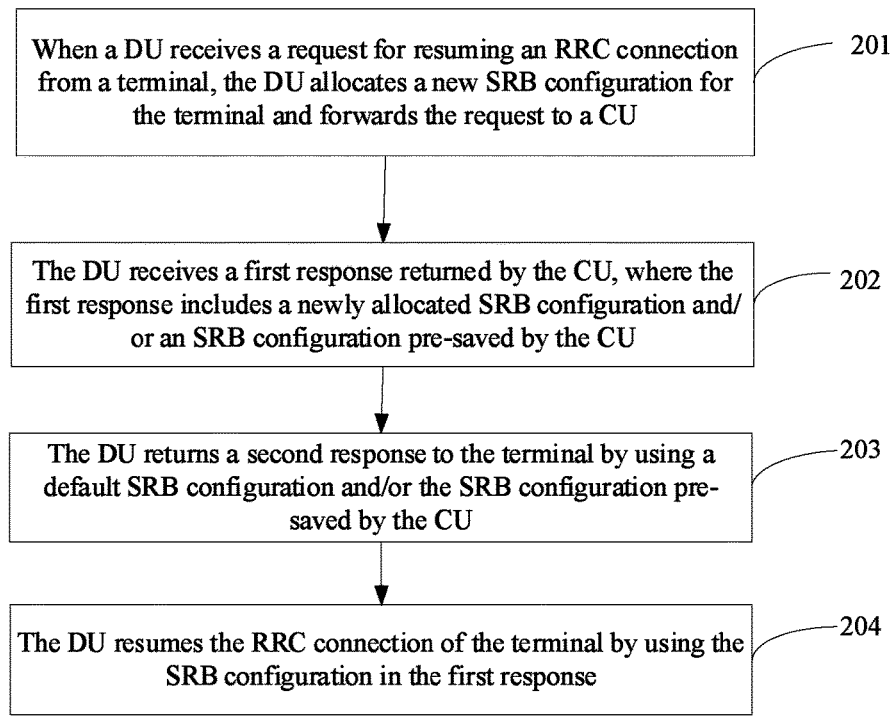
FIG. 2 is a schematic diagram illustrating a flowchart of an RRC state transition method according to an embodiment of the present application.

As shown in FIG. 2, an RRC state transition method according to the present application includes the following steps.

In step 201, when a DU receives a request for resuming an RRC connection from a terminal, the DU allocates a new SRB configuration for the terminal and forwards the request to a CU.

In an embodiment of the present application, the DU forwards the request to the CU through an initial uplink (UL) RRC message.

It should be noted that since the DU releases the SRB configuration of the terminal when the terminal changes from the current state to the RRC inactive state, when the terminal requests to resume the RRC connection, the DU needs to re-allocate a new SRB configuration for the terminal.

In step 202, the DU receives a first response returned by the CU, where the first response includes a newly allocated SRB configuration and/or an SRB configuration pre-saved by the CU.

In an embodiment of the present application, the first response is a UE Context Setup Request message and/or a downlink (DL) RRC Message Transfer message.

For example, when the CU saves part (e.g., the PDCP configuration) of the SRB configuration, the CU sends the saved SRB configuration to the DU through a downlink RRC Transfer message, and the downlink RRC Transfer message includes an RRC connection resume message. The RRC connection resume message includes the SRB configuration saved by the CU. After receiving the downlink RRC Transfer message sent by the CU, the DU acquires the RRC connection resume message in the downlink RRC Transfer message and sends the RRC connection resume message to the terminal.

When the CU saves the entire SRB configuration (i.e., PDCP configuration, RLC configuration, and logical channel configuration), the CU sends the saved entire SRB configuration to the DU through a UE context establishment request message.

In some embodiments, the SRB configuration in the first response includes at least one of the following: part of the SRB configuration newly allocated by the CU, part of the SRB configuration newly allocated by the DU, part of the SRB configuration pre-saved by the CU, or an entire SRB configuration pre-saved by the CU.

In step 203, the DU returns a second response to the terminal by using a default SRB configuration and/or the SRB configuration pre-saved by the CU.

In an embodiment of the present application, the DU uses the default SRB configuration (including the default RLC configuration and the default logical channel configuration) and the CU uses the default SRB configuration to return a second response to the terminal.

In an embodiment of the present application, the DU returns the second response to the terminal by using the default SRB configuration (including the default RLC configuration and the default logical channel configuration) and the PDCP configuration pre-saved by the CU.

In an embodiment of the present application, the DU returns a second response to the terminal (at this time, the second response may include the SRB configuration newly allocated by the CU or the DU, or not include the SRB configuration newly allocated by the CU or the DU) by using the PDCP configuration, RLC configuration, and logical channel configuration pre-saved by the CU.

For example, when the CU does not save any SRB configuration of the terminal in advance, the DU returns the second response to the terminal by using the default SRB configuration (including the default PDCP configuration, the default RLC configuration, and the default logical channel configuration). When the CU merely saves the PDCP configuration of the terminal in advance, the DU returns the second response to the terminal by using the default SRB configuration (including the default RLC configuration and the default logical channel configuration) and the PDCP configuration pre-saved by the CU. When the CU saves the PDCP configuration, RLC configuration, and logical channel configuration of the terminal in advance, the DU returns a second response to the terminal (at this time, the second response may include the SRB configuration newly allocated by the CU or the DU, or not include the SRB configuration newly allocated by the CU or the DU) by using the PDCP configuration, RLC configuration, and logical channel configuration pre-saved by the CU.

In an embodiment of the present application, the second response is an RRC Connection Resume message.

In some embodiments, the second response includes any one or merging of the following: a PDCP configuration newly allocated by the CU, an RLC configuration newly allocated by the DU, or a logical channel configuration newly allocated by the DU.

In step 204, the DU resumes the RRC connection of the terminal by using the SRB configuration in the first response.

In an embodiment of the present application, the DU recovers the RRC connection of the terminal by using part of the SRB configuration newly allocated by the DU.

In an embodiment of the present application, the DU recovers the RRC connection of the terminal by using part or all of the SRB configuration pre-saved by the CU.

An embodiment of the present application further provides a Distributed Unit (DU), and the Distributed Unit includes a processor and a memory connected to the processor.

The processor is configured to execute an RRC state transition program stored in the memory to implement the steps of the RRC state transition method according to any one of the above.

An embodiment of the present application further provides a computer-readable storage medium, and the computer-readable storage medium stores one or more programs which, when executed by one or more processors, implement the steps of the RRC state transition method according to any one of the above.

Figure 3:
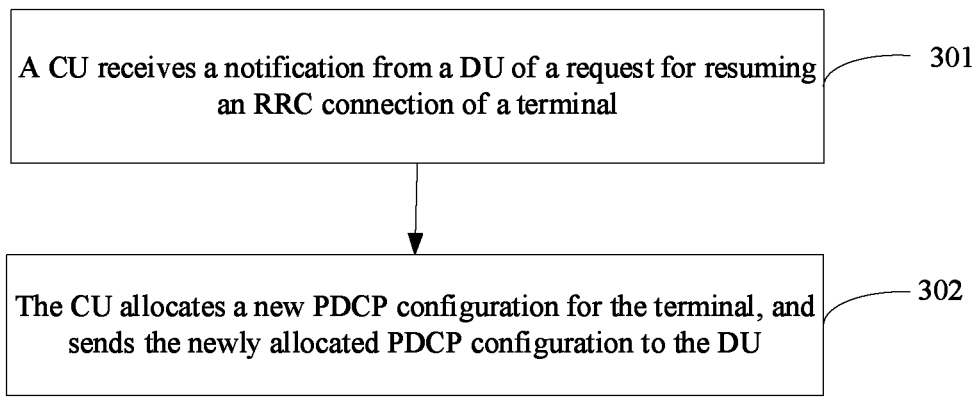
FIG. 3 is a schematic diagram illustrating a flowchart of an RRC state transition method according to an embodiment of the present application.

As shown in FIG. 3, an RRC state transition method according to the present application includes the following steps.

In step 301, a CU receives a notification from a DU of a request for resuming an RRC connection of a terminal.

In some embodiments, the method further includes the following steps.

When the CU changes the terminal to an RRC inactive state, the PDCP configuration of the terminal is released.

In step 302, the CU allocates a new PDCP configuration for the terminal, and sends the newly allocated PDCP configuration to the DU.

In an embodiment of the present application, the CU sends the newly allocated PDCP configuration to the DU through a downlink RRC Transfer message.

Figure 4:
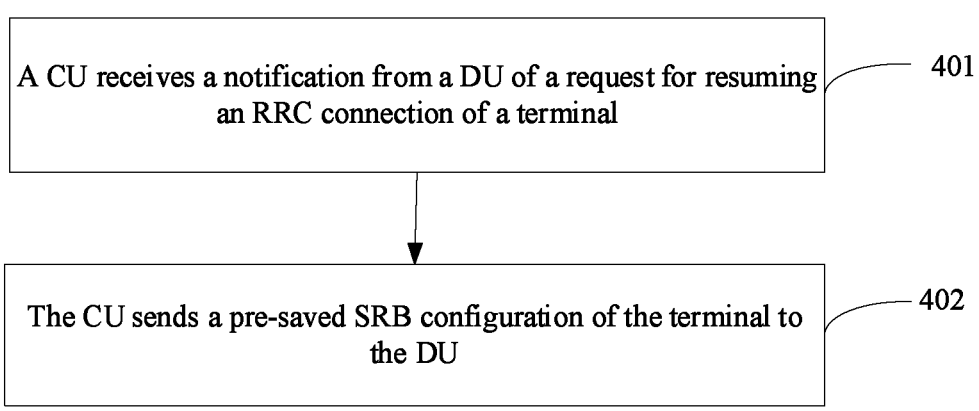
FIG. 4 is a schematic diagram illustrating a flowchart of an RRC state transition method according to an embodiment of the present application.

As shown in FIG. 4, an RRC state transition method according to the present application includes the following steps.

In step 401, a CU receives a notification from a DU of a request for resuming an RRC connection of a terminal.

In some embodiments, the method further includes the following steps.

When the CU changes the terminal to an RRC inactive state, the SRB configuration of the terminal is saved.

In some embodiments, the saved SRB configuration includes any one or merging of the following: a PDCP configuration, an RLC configuration, or a logical channel configuration.

In step 402, the CU sends a pre-saved SRB configuration of the terminal to the DU.

In an embodiment of the present application, when the CU saves part (e.g., PDCP configuration) of the SRB configuration, the CU sends the saved SRB configuration to the DU through a downlink RRC Transfer message, and the downlink RRC Transfer message includes RRC connection resume message. The RRC connection resume message includes the SRB configuration saved by the CU, and after receiving the downlink RRC Transfer message sent by the CU, the DU acquires the RRC connection resume message in the downlink RRC Transfer message, and sends the connection resume message to the terminal.

In an embodiment of the present application, when the CU saves entire SRB configuration (i.e., PDCP configuration, RLC configuration, and logical channel configuration), the CU sends the saved entire SRB configuration (i.e., RLC configuration, logical channel configuration) related to the DU to the DU.

An embodiment of the present application further provides a CU, and the CU includes a processor and a memory.

The processor is configured to execute an RRC state transition program stored in the memory to implement the steps of the RRC state transition method according to any one of the above.

An embodiment of the present application further provides a computer-readable storage medium, and the computer-readable storage medium stores one or more programs which, when executed by one or more processors, implement the steps of the RRC state transition method according to any one of the above.

Examples are provided below to further explain the application, but it is worth noting that the example is only for better description of the application and does not constitute an improper limitation on the application. It should be noted that a user equipment (UE) in each of the following examples may be understood as a terminal.

Figure 5:
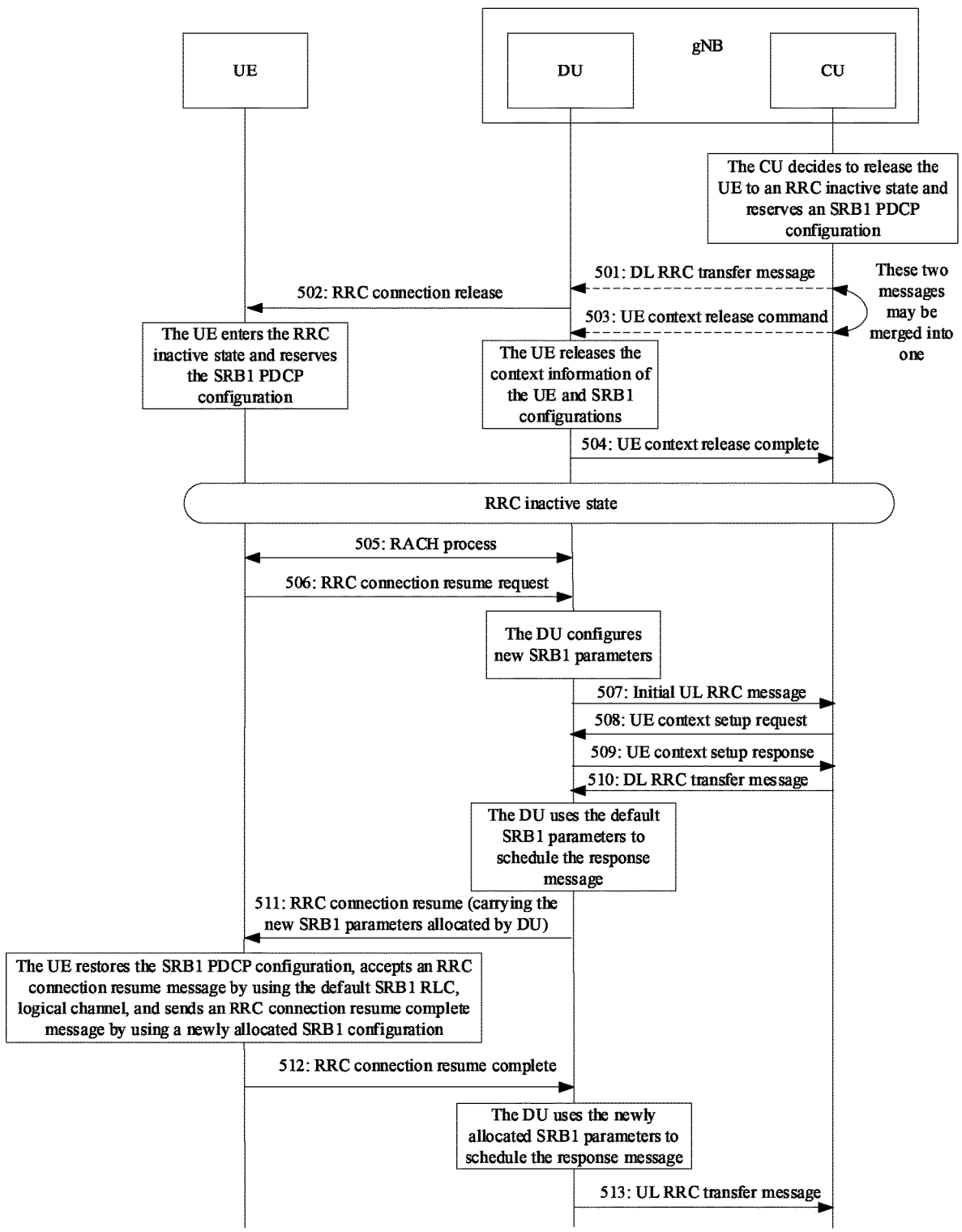
FIG. 5 is a schematic diagram illustrating an RRC state transition process according to an embodiment of the present application.

As shown in FIG. 5, in the example, an RRC state transition process includes the following steps.

In step 501, when a base station side decides to release a UE to an RRC inactive state, a CU side reserves SRB1 PDCP related configuration and resource, and sends a downlink RRC Transfer message to a DU, where the downlink RRC Transfer message carries an RRC Connection Release Message.

In step 502, the DU sends the RRC Connection Release message to the UE; after receiving the message, the UE enters the RRC inactive state, and only the PDCP related configuration and resource for SRB1 are reserved.

In step 503, the CU sends a UE Context Release Command message to the DU. The UE Context Release Command message is used to instruct the DU to release UE context information.

In step 504, after receiving the message in step 503, the DU releases the related configuration and resource of the SRB1 and other context information; and sends a UE Context Release Complete message to the CU.

In step 505, when the UE needs to transit from the RRC inactive state to the RRC connected state, the UE needs to perform a Random Access Channel (RACH) process with the base station side.

In step 506, after the RACH process, the UE sends an RRC Connection Resume Request message to the base station.

In step 507, after receiving the RRC Connection Resume Request message sent by the UE, if the UE is accepted successfully, the DU allocates new SRB1 resources (including RLC configuration, logical channel configuration) to the UE, and sends an initial uplink RRC message to the CU.

In step 508, the CU triggers the DU to establish UE context.

In step 509, the DU allocates other corresponding configurations and resources to the UE, and notifies the CU.

In step 510, the CU encodes the resources reallocated for the UE and sends the resources to the DU through a DL RRC Transfer Message. The DL RRC Transfer Message carries an RRC Connection Resume message.

In step 511, after receiving the message, the DU sends an RRC Connection Resume message to the terminal by using the protocol default SRB1 RLC and Logic Channel configurations and resources. The RRC Connection Resume message carries new SRB1 resources (including RLC Config, Logical Channel Config) allocated by the DU for the UE.

In step 512, the UE analyzes the RRC Connection Resume message sent by the base station according to the reserved SRB1 PDCP configuration and the default SRB1 RLC and Logic Channel configuration, and replaces the protocol default SRB1 configuration resources with the new SRB1 resources (including RLC Config, Logical Channel Config) carried in the message, and uses the new SRB1 resource (including RLC Config, Logical Channel Config) and the reserved SRB1 PDCP Config configuration to send an RRC Connection Resume Complete message.

In step 513, after receiving the RRC Connection Resume Complete message by using the newly allocated SRB1 resource, the DU side sends the RRC Connection Resume Complete message to the CU through an UL RRC Transfer Message.

It should be noted that in the above process, the DL RRC Message Transfer message in step 501 and the UE Context Release Command message in step 503 may also be merged into one message. The merged message may directly indicate that the current message is used to release the UE context information. The UE context release completion message in step 504 may be determined according to the message merging conditions in steps 501 and 503. That is, when the message merged in step 501 and step 503 is UE Context Release Command, the UE Context Release Command Complete message in step 504 is required; when the message merged in step 501 and step 503 is DL RRC Message Transfer, the UE Context Release Command Complete message in step 504 is not required.

Figure 6:
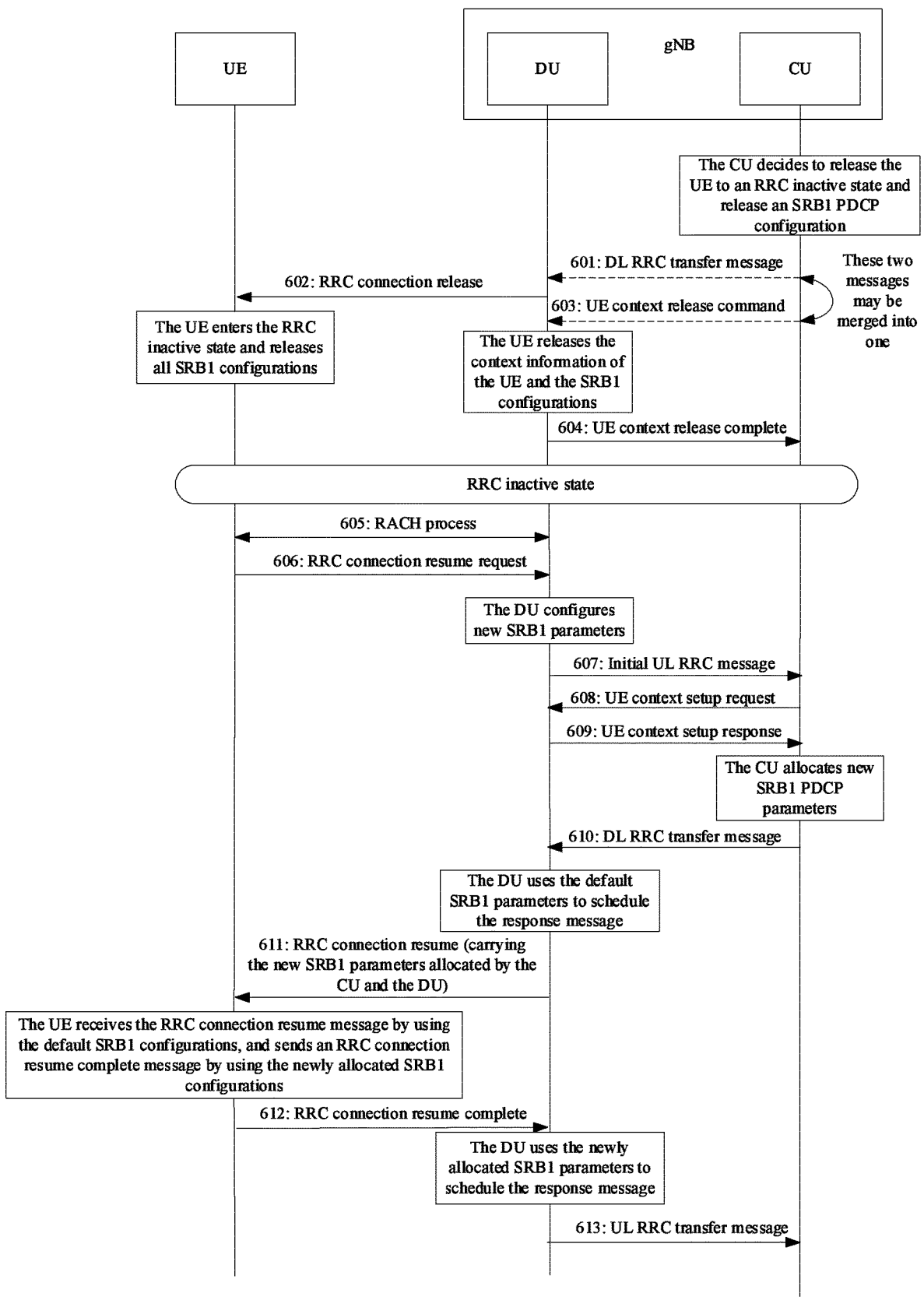
FIG. 6 is a schematic diagram illustrating an RRC state transition process according to an embodiment of the present application.

As shown in FIG. 6, in the example, an RRC state transition process includes the following steps.

In step 601, when a base station side decides to release a UE to an RRC inactive state, a CU side releases SRB1 PDCP related configuration and resource, and sends a DL RRC Transfer message to a DU, where the DL RRC Transfer message carries an RRC Connection Release Message.

In step 602, the DU sends the RRC Connection Release message to the UE; after receiving the message, the UE enters the RRC inactive state, and releases all configurations and resources of SRB1.

In step 603, the CU sends a UE Context Release Command message to the DU to instruct the DU to release the UE context information.

In step 604, after receiving the message in step 603, the DU releases the related configurations and resources of the SRB1 and other context information; and sends a UE Context Release Complete message to the CU.

In step 605, when the UE needs to transit from the RRC inactive state to the RRC connected state, the UE needs to perform a RACH process with the base station side.

In step 606, after the RACH process, the UE sends an RRC Connection Resume Request message to the base station.

In step 607, after receiving the RRC Connection Resume Request message sent by the UE, if the UE is accepted successfully, the DU allocates new SRB1 resources (including RLC Config, Logical Channel Config) to the UE, and sends an Initial UL RRC Message to the CU.

In step 608, the CU triggers the DU to establish UE context.

In step 609, the DU allocates other corresponding configurations and resources to the UE, and notifies the CU.

In step 610, the CU allocates a new SRB1 PDCP resource (including PDCP Config) for the UE, encodes the resource reallocated to the UE, and sends the resource to the DU through a DL RRC Transfer Message, where the DL RRC Transfer Message carries an RRC Connection Resume message.

In step 611, after receiving the message, the DU sends an RRC Connection Resume message to the terminal by using the protocol default SRB1 RLC and Logic channel configuration and resources. The RRC Connection Resume message carries a new SRB1 resource (including RLC Config, Logical Channel Config) allocated by the DU for the UE.

In step 612, the UE analyzes the RRC Connection Resume message sent by the base station according to the default SRB1 PDCP, RLC, Logic channel configurations, and replaces the protocol default SRB1 configuration resources with the newly allocated SRB1 resources (including PDCP Config, RLC Config, Logical Channel Config) carried in the message, and uses the newly allocated SRB1 resources (including PDCP Config, RLC Config, Logical Channel Config) to send an RRC Connection Resume Complete message.

In step 613, after receiving the RRC Connection Resume Complete message by using the newly allocated SRB1 resources, the DU side sends the RRC Connection Resume Complete message to the CU through an UL RRC Transfer Message.

It should be noted that in the above process, the DL RRC Message Transfer message in step 601 and the UE Context Release Command message in step 603 may also be merged into one message. The merged message may directly indicate that the current message is used to release the UE context information. The UE context release completion message in step 604 may be determined according to the message merging conditions in steps 601 and 603. That is, when the message merged in step 601 and step 603 is UE Context Release Command, the UE Context Release Command Complete message in step 604 is required; when the message merged in step 601 and step 603 is DL RRC Message Transfer, the UE Context Release Command Complete message in step 604 is not required.

Figure 7:
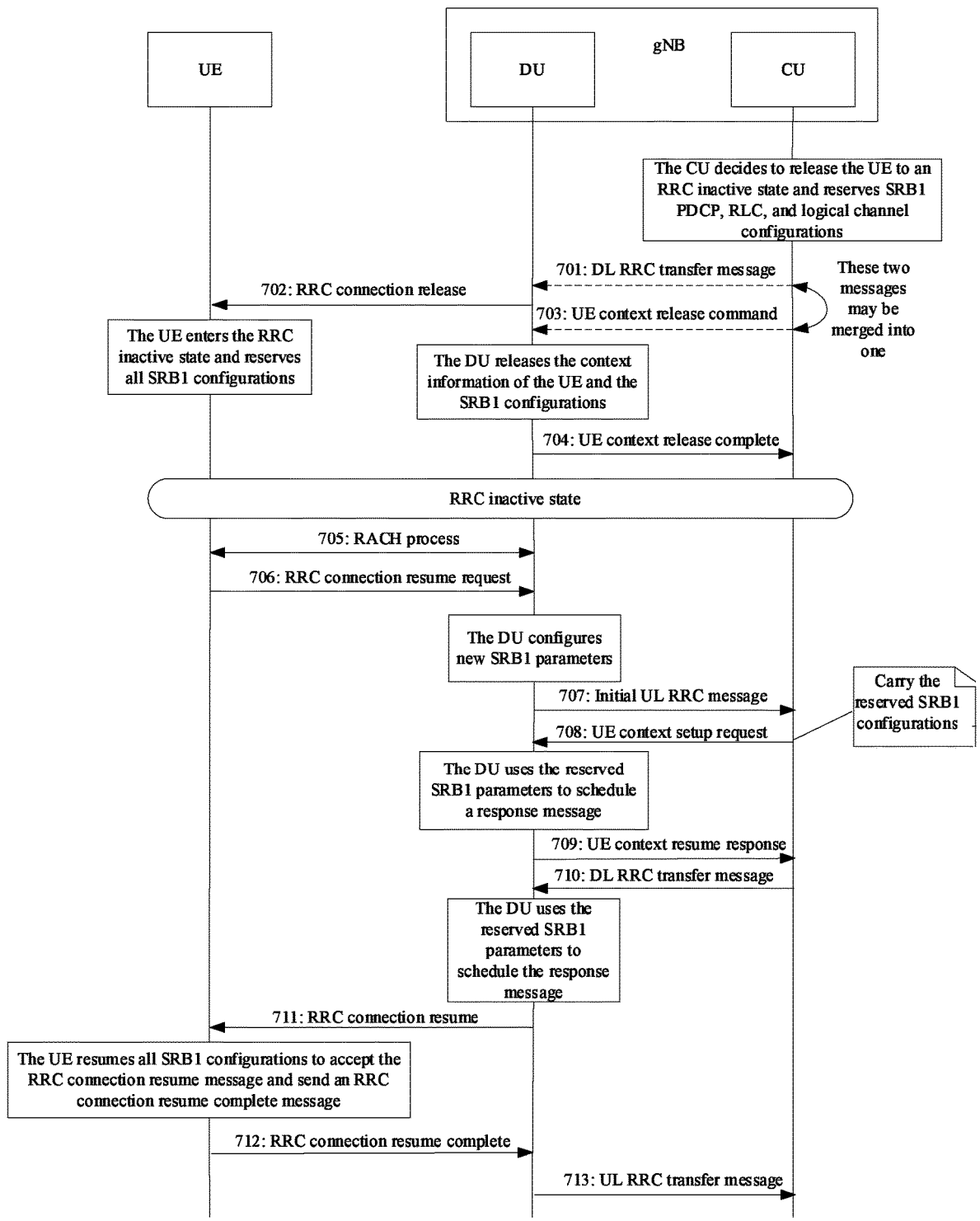
FIG. 7 is a schematic diagram illustrating an RRC state transition process according to an embodiment of the present application.

As shown in FIG. 7, in the example, an RRC state transition process includes the following steps.

In step 701, when a base station side decides to release a UE to an RRC inactive state, a CU side saves SRB1 PDCP related configurations and resource, stores configurations and resources of SRB1 (including RLC Config, Logical Channel Config) allocated by the DU, and sends a DL RRC Transfer message to a DU, where the DL RRC Transfer message carries an RRC Connection Release Message.

In step 702, the DU sends an RRC Connection Release message to the UE; after receiving the message, the UE enters the RRC inactive state and reserves all related configurations and resources (including PDCP Config, RLC Config, and Logical Channel Config) of SRB1.

In step 703, the CU sends a UE Context Release Command message to the DU to instruct the DU to release the UE context information.

In step 704, after receiving the UE Context Release Command message in step 703, the DU releases the related configurations and resources of the SRB1 and other context information; and sends a UE Context Release Complete message to the CU.

In step 705, when the UE needs to transit from the RRC inactive state to the RRC connected state, the UE needs to perform a RACH process with the base station side.

In step 706, after the RACH process, the UE sends an RRC Connection Resume Request message to the base station.

In step 707, after receiving the RRC Connection Resume Request message sent by the UE, if the UE is accepted successfully, the DU allocates new SRB1 resources (including RLC Config, Logical Channel Config) to the UE, and sends an Initial UL RRC Message to the CU.

In step 708, the CU triggers the DU to establish UE context, and simultaneously carries the SRB1 resources reserved when the UE is suspended.

In step 709, the DU replaces the newly allocated SRB1 resources with the reserved SRB1 resources, allocates other corresponding configurations and resources for the UE, and sends the configurations and resources to the CU through a UE Context Setup Response message.

In step 710, the CU encodes the resources reallocated to the UE, and sends the resources to the DU through a DL RRC Transfer Message, where the DL RRC Transfer Message carries an RRC Connection Resume message.

In step 711, after receiving the message, the DU sends an RRC Connection Resume message to the terminal by using the reserved SRB1 configurations and resources when the UE is suspended.

In step 712, the UE parses the RRC Connection Resume message sent by the base station according to the reserved SRB1 PDCP, RLC, and Logic channel configurations, and sends an RRC Connection Resume Complete message.

In step 713, after receiving the RRC Connection Resume Complete message, the DU side sends the RRC Connection Resume Complete message to the CU through an UL RRC Transfer Message.

It should be noted that in the above process, the DL RRC Message Transfer message in step 701 and the UE Context Release Command message in step 703 may also be merged into one message. The merged message may directly indicate that the current message is used to release the UE context information. The UE context release completion message in step 704 may be determined according to the message merging conditions in steps 701 and 703. That is, when the message merged in step 701 and step 703 is UE Context Release Command, the UE Context Release Command Complete message in step 704 is required; when the message merged in step 701 and step 703 is DL RRC Message Transfer, the UE Context Release Command Complete message in step 704 is not required.

Figure 8:
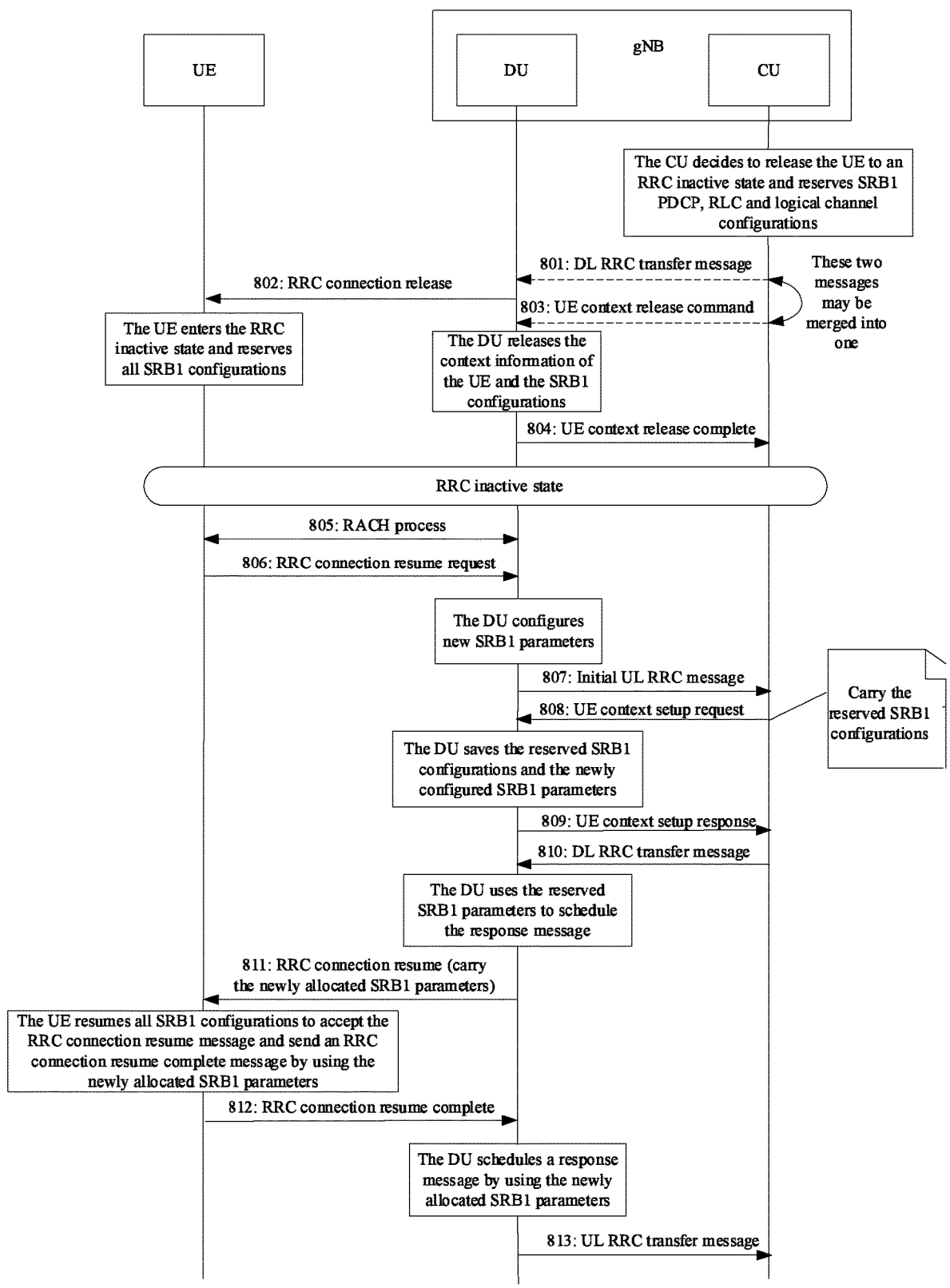
FIG. 8 is a schematic diagram illustrating an RRC state transition process according to an embodiment of the present application.

As shown in FIG. 8, in the example, an RRC state transition process includes the following steps.

In step 801, when a base station side decides to release a UE to an RRC inactive state, a CU side saves SRB1 PDCP related configuration and resource, stores configurations and resources of SRB1 (including RLC Config, Logical Channel Config) allocated by the DU, and sends a DL RRC Transfer message to a DU, where the DL RRC Transfer message carries an RRC Connection Release Message.

In step 802, the DU sends an RRC Connection Release message to the UE; after receiving the message, the UE enters the RRC inactive state and reserves all related configurations and resources (including PDCP Config, RLC Config, and Logical Channel Config) of SRB1.

In step 803, the CU sends a UE Context Release Command message to the DU to instruct the DU to release the UE context information.

In step 804, after receiving the UE Context Release Command message in step 803, the DU releases the related configurations and resources of the SRB1 and other context information; and sends a UE Context Release Complete message to the CU.

In step 805, when the UE needs to transit from the RRC inactive state to the RRC connected state, the UE needs to perform a RACH process with the base station side.

In step 806, after the RACH process, the UE sends an RRC Connection Resume Request message to the base station.

In step 807, after receiving the RRC Connection Resume Request message sent by the UE, if the UE is accepted successfully, the DU allocates new SRB1 resources (including RLC Config, Logical Channel Config) to the UE, and sends an Initial UL RRC Message to the CU.

In step 808, the CU triggers the DU to establish UE context, and simultaneously carries the SRB1 resource reserved when the UE is suspended.

In step 809, the DU stores the reserved SRB1 resources and the newly allocated SRB1 resources, at the same time, allocates other corresponding configurations and resources for the UE, and sends the configurations and resources to the CU through a UE Context Setup Response message.

In step 810, the CU encodes the resources reallocated to the UE, and sends the resources to the DU through a DL RRC Transfer Message, where the DL RRC Transfer Message carries an RRC Connection Resume message.

In step 811, after receiving the message, the DU schedules an RRC Connection Resume message by using the reserved SRB1 configurations and resources when the UE is suspended. The RRC Connection Resume message carries the new SRB1 resources (including RLC Config, Logical Channel Config) allocated by the DU for the UE.

In step 812, the UE analyzes the RRC Connection Resume message sent by the base station according to the reserved SRB1 PDCP, RLC, Logic channel configurations, and replaces the reserved SRB1 configuration resources with the newly allocated SRB1 resources (including PDCP Config, RLC Config, Logical Channel Config) carried in the message, and uses the newly allocated SRB1 resources (including PDCP Config, RLC Config, Logical Channel Config) to send an RRC Connection Resume Complete message.

In step 813, after receiving the RRC Connection Resume Complete message by using the newly allocated SRB1 resource, the DU side sends the RRC Connection Resume Complete message to the CU through an UL RRC Transfer Message.

It should be noted that in the above process, the DL RRC Message Transfer message in step 801 and the UE Context Release Command message in step 803 may also be merged into one message.

The merged message may directly indicate that the current message is used to release the UE context information. The UE context release completion message in step 804 may be determined according to the message merging conditions in steps 801 and 803. That is, when the message merged in step 801 and step 803 is UE Context Release Command, the UE Context Release Command Complete message in step 804 is required; when the message merged in step 801 and step 803 is DL RRC Message Transfer, the UE Context Release Command Complete message in step 804 is not required.

The RRC state transition method provided in the application can realize the transition between the RRC inactive state and the connected state in the case of CU-DU separation. At the same time, the application is also applicable to a situation where base stations acquire UE context information between base stations due to the movement of UE. When a UE moves from a coverage area of an original base station to a coverage area of a new base station, the new base station acquires the UE's Context information from the original base station. When the new base station decides to release the UE from the RRC connected state to the RRC inactive state or transitions from the RRC inactive state to the RRC connected state, the RRC state transition method of the present application may be used for the transition.

It should be understood by those skilled in the art that all or some steps in the methods described above may be implemented by relevant hardware as instructed by programs, and the programs may be stored in a computer-readable storage medium, such as a read-only memory, a magnetic disk, an optical disk or the like. In some embodiments, all or part of the steps in the above embodiments may also be implemented by using one or more integrated circuits. Accordingly, each module/unit in the above embodiments may be implemented in the form of hardware or software function module. The present application is not limited to any specific merging of hardware and software.

The above are merely preferred embodiments of the present application and are not intended to limit the present application, and for those skilled in the art, the present application may have various modifications and variations. Any modifications, equivalent substitutions, improvements and the like made within the spirit and principle of the present application should fall within the scope of the present application.

I claim:

1. A Radio Resource Control (RRC) state transition method, comprising:
   allocating, by a Distributed Unit (DU), a new Signaling Radio Bearer 1 (SRB1) configuration for a terminal, responsive to receiving a request for resuming an RRC connection from the terminal;
   forwarding, by the DU, the request to a Centralized Unit (CU);
   receiving, by the DU, a first response from the CU, wherein the first response comprises an SRB1 configuration stored by the CU;
   receiving, by the DU, a second response from the CU in response to the request for resuming the RRC connection;
   forwarding, by the DU, the second response to the terminal using a default SRB1 configuration; and
   resuming, by the DU, the RRC connection of the terminal by using the SRB1 configuration in the first response,
   wherein the new SRB1 configuration comprises a new Radio Link Control, RLC, configuration and a new logical channel configuration allocated by the DU,
   wherein the SRB1 configuration stored by the CU comprises a RLC configuration and a logical channel configuration stored by the CU when the terminal is suspended, and
   wherein the default SRB1 configuration comprises a default RLC configuration and a default logical channel configuration.

2. A Radio Resource Control (RRC) state transition method, comprising:
   receiving, by a Centralized Unit (CU) from a Distributed Unit (DU), a request from a terminal for resuming an RRC connection, wherein the DU allocates a new Signaling Radio Bearer 1 (SRB1) configuration for the terminal responsive to the request;
   sending, by the CU to the DU, a first response which comprises an SRB1 configuration stored by the CU; and
   sending, by the CU to the DU, a second response responsive to the request for resuming the RRC connection, wherein the terminal receives the second response from the DU using a default SRB1 configuration,
   wherein the new SRB1 configuration comprises a new Radio Link Control, RLC, configuration and a new logical channel configuration allocated by the DU,
   wherein the SRB1 configuration stored by the CU comprises a RLC configuration and a logical channel configuration stored by the CU when the terminal is suspended, and
   wherein the default SRB1 configuration comprises a default RLC configuration and a default logical channel configuration.

3. A Distributed Unit (DU), comprising:
   at least one processor configured to:
   allocate a new Signaling Radio Bearer 1 (SRB1) configuration for a terminal, responsive to receiving a request for resuming an RRC connection from the terminal;
   forward the request to a Centralized Unit (CU);
   receive a first response from the CU, wherein the first response comprises an SRB1 configuration stored by the CU;
   receive a second response from the CU in response to the request for resuming the RRC connection;
   forward the second response to the terminal using a default SRB1 configuration; and
   resume the RRC connection of the terminal by using the SRB1 configuration in the first response,
   wherein the new SRB1 configuration comprises a new Radio Link Control, RLC, configuration and a new logical channel configuration allocated by the DU,
   wherein the SRB1 configuration stored by the CU comprises a RLC configuration and a logical channel configuration stored by the CU when the terminal is suspended, and
   wherein the default SRB1 configuration comprises a default RLC configuration and a default logical channel configuration.

4. A Centralized Unit (CU), comprising:
   at least one processor configured to:
   receive, from a Distributed Unit (DU), a request from a terminal for resuming an RRC connection, wherein the DU allocates a new Signaling Radio Bearer 1 (SRB1) configuration for the terminal responsive to the request;
   send, to the DU, a first response which comprises an SRB1 configuration stored by the CU; and
   send, to the DU, a second response responsive to the request for resuming the RRC connection, wherein the terminal receives the second response from the DU using a default SRB1 configuration,
   wherein the new SRB1 configuration comprises a new Radio Link Control, RLC, configuration and a new logical channel configuration allocated by the DU,
   wherein the SRB1 configuration stored by the CU comprises a RLC configuration and a logical channel configuration stored by the CU when the terminal is suspended, and
   wherein the default SRB1 configuration comprises a default RLC configuration and a default logical channel configuration.

* * * * *